(12) United States Patent
Omar et al.

(10) Patent No.: US 11,892,574 B2
(45) Date of Patent: Feb. 6, 2024

(54) DYNAMIC LIDAR TO CAMERA ALIGNMENT

(71) Applicant: GM GLOBAL TECHNOLOGY OPERATIONS LLC, Detroit, MI (US)

(72) Inventors: Yousef A. Omar, Troy, MI (US); Hao Yu, Troy, MI (US); Wende Zhang, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 819 days.

(21) Appl. No.: 16/944,253

(22) Filed: Jul. 31, 2020

(65) Prior Publication Data

US 2022/0035014 A1 Feb. 3, 2022

(51) Int. Cl.
| | |
|---|---|
| *G01S 7/497* | (2006.01) |
| *G01S 17/86* | (2020.01) |
| *G01S 17/931* | (2020.01) |
| *G06T 7/70* | (2017.01) |

(52) U.S. Cl.
CPC ............ *G01S 7/4972* (2013.01); *G01S 17/86* (2020.01); *G01S 17/931* (2020.01); *G06T 7/70* (2017.01)

(58) Field of Classification Search
None
See application file for complete search history.

(56) References Cited

U.S. PATENT DOCUMENTS

| 10,916,035 | B1* | 2/2021 | Kroeger | G05D 1/0212 |
| 2019/0033459 | A1* | 1/2019 | Tisdale | G06V 20/56 |
| 2020/0005489 | A1* | 1/2020 | Kroeger | G06T 7/85 |
| 2020/0301013 | A1* | 9/2020 | Banerjee | G01S 13/867 |
| 2021/0004577 | A1* | 1/2021 | Amat Roldan | G06T 7/74 |

* cited by examiner

*Primary Examiner* — Yuqing Xiao
*Assistant Examiner* — Jempson Noel
(74) *Attorney, Agent, or Firm* — Lorenz & Kopf LLP

(57) ABSTRACT

Systems and method are provided for controlling a vehicle. In one embodiment, a method includes: receiving, by a controller onboard the vehicle, lidar data from the lidar device; receiving, by the controller, image data from the camera device; computing, by the controller, an edge map based on the lidar data; computing, by the controller, an inverse distance transformation (IDT) edge map based on the image data; aligning, by the controller, points of the IDT edge map with points of the lidar edge map to determine extrinsic parameters; storing, by the controller, extrinsic parameters as calibrations in a data storage device; and controlling, by the controller, the vehicle based on the stored calibrations.

20 Claims, 4 Drawing Sheets

DYNAMIC LIDAR TO CAMERA ALIGNMENT

TECHNICAL FIELD

The present disclosure generally relates to alignments systems, and more particularly relates to systems and methods for lidar to camera alignment in a vehicle.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, autonomous vehicle features rely on sensor data to be accurately and precisely converted into real world coordinates for data association and sensor fusion. Many systems combine data from different sensors for more accurate predictions. In order to combine the data from different sensors, the sensors must be aligned through calibration parameters, referred to as extrinsic parameters.

Accordingly, it is desirable to provide improved systems and methods for aligning sensors of a vehicle using estimated extrinsic parameters. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method includes: receiving, by a controller onboard the vehicle, lidar data from the lidar device; receiving, by the controller, image data from the camera device; computing, by the controller, an edge map based on the lidar data; computing, by the controller, an inverse distance transformation (IDT) edge map based on the image data; aligning, by the controller, points of the IDT edge map with points of the lidar edge map to determine extrinsic parameters; storing, by the controller, extrinsic parameters as calibrations in a data storage device; and controlling, by the controller, the vehicle based on the stored calibrations.

In various embodiments, the IDT edge map includes an emphasis on vehicle contours defined in the image data.

In various embodiments, the method includes determining a quality of a pair of points in the IDT edge map and the lidar edge map, and wherein the aligning is based on the quality of the pair.

In various embodiments, the method includes determining the quality of the pair based on a data quality estimation classifier.

In various embodiments, the method includes determining the quality of the pair based on a computed ego-motion of a vehicle.

In various embodiments, the method includes determining the quality of the pair based on a segmentation convolutional neural network.

In various embodiments, the aligning is based on a search method that computes six degrees of freedom of objects in the IDT edge map.

In various embodiments, the search method comprises a two-stage search method, the first stage comprising a coarse level of refinement, and the second stage comprising a fine level of refinement.

In various embodiments, the aligning is iteratively performed until a confidence estimation reaches a predefined percentage.

In various embodiments, the aligning is iteratively performed until a count of iterations reaches a predefined value.

In another embodiments, a vehicle system includes: a lidar device; a camera device; and a controller. The controller is configured to, by a processor, receive lidar data from the lidar device, receive image data from the camera device, compute an edge map based on the lidar data, compute an inverse distance transformation (IDT) edge map based on the image data, align points of the IDT edge map with points of the lidar edge map to determine extrinsic parameters, store extrinsic parameters as calibrations in a data storage device, and control the vehicle based on the stored calibrations.

In various embodiments, the IDT edge map includes an emphasis on vehicle contours defined in the image data.

In various embodiments, the controller if further configured to determine a quality of a pair of points in the IDT edge map and the lidar edge map, and wherein the aligning is based on the quality of the pair.

In various embodiments, the controller if further configured to determine the quality of the pair based on a data quality estimation classifier.

In various embodiments, the controller if further configured to determine the quality of the pair based on a computed ego-motion of a vehicle.

In various embodiments, the controller if further configured to determine the quality of the pair based on a segmentation convolutional neural network.

In various embodiments, the controller is configured to align based on a search method that computes six degrees of freedom of objects in the IDT edge map.

In various embodiments, the search method comprises a two-stage search method, the first stage comprising a coarse level of refinement, and the second stage comprising a fine level of refinement.

In various embodiments, the controller is configured to iteratively align until a confidence estimation reaches a predefined percentage.

In various embodiments, the controller is configured to iteratively align until a count of iterations reaches a predefined value.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
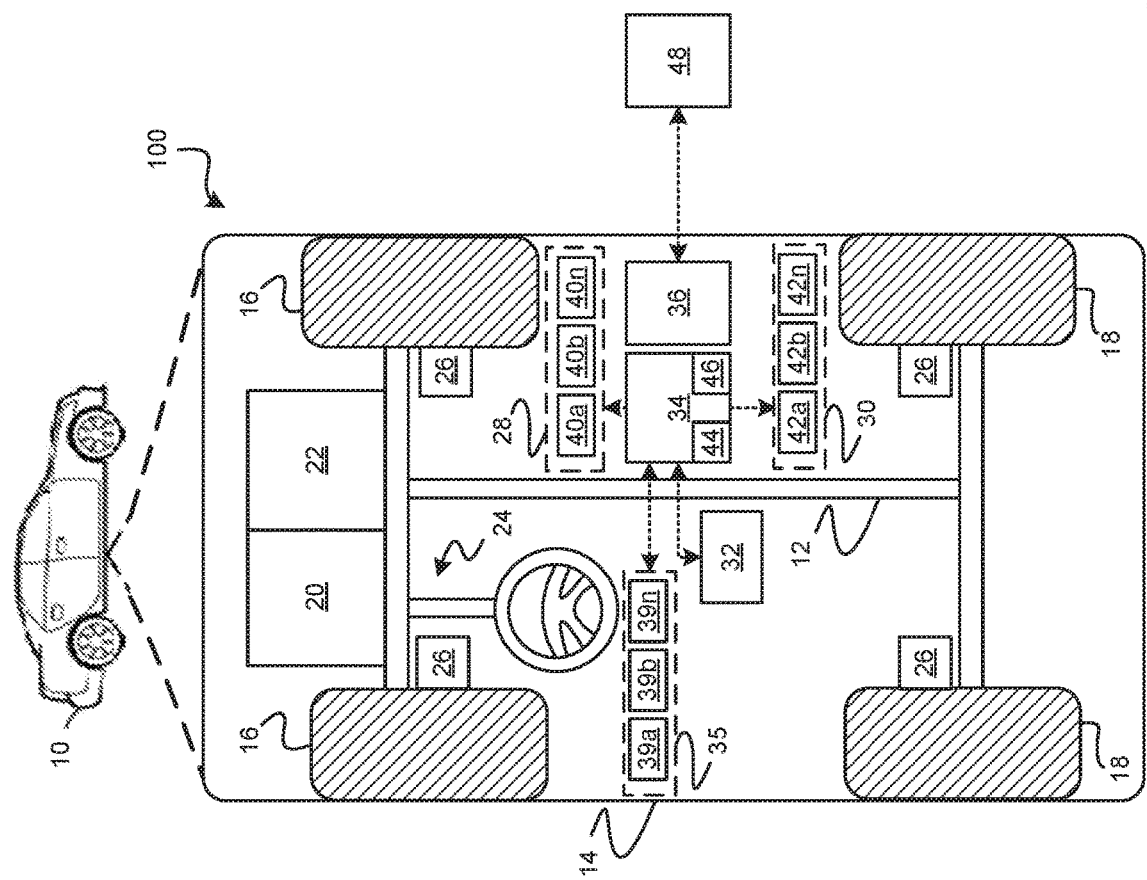
FIG. 1 is a functional block diagram illustrating an autonomous vehicle an alignment system, in accordance with various embodiments.

With reference now to FIG. 1, a control system shown generally at 100 is associated with a vehicle 10 in accordance with various embodiments. In general, the control system 100 selectively aligns two sensors of the vehicle 10 by estimating extrinsic parameters. As will be discussed in more detail, the estimating is based on a method that iteratively aligns points from data sets generated by the two sensors. In various embodiments, the two sensors include a lidar sensor and a camera sensor. As can be appreciated, other sensors can be implemented in various embodiments.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the vehicle may be a non-autonomous vehicle and is not limited to the present examples.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors.

In various embodiments, the sensing devices 40a-40n are disposed at different locations of the vehicle 10. In exemplary embodiments described herein, one or more of the sensing devices 40-40n are realized as lidar devices. In this regard, each of the sensing devices 40a-40n may include or incorporate one or more lasers, scanning components, optical arrangements, photodetectors, and other components suitably configured to horizontally and rotatably scan the environment in the vicinity of the vehicle 10 with a particular angular frequency or rotational velocity. In exemplary embodiments described herein, one or more of the sensing devices 40a-40n are realized as optical cameras configured to capture images of the environment in the vicinity of the vehicle 10.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
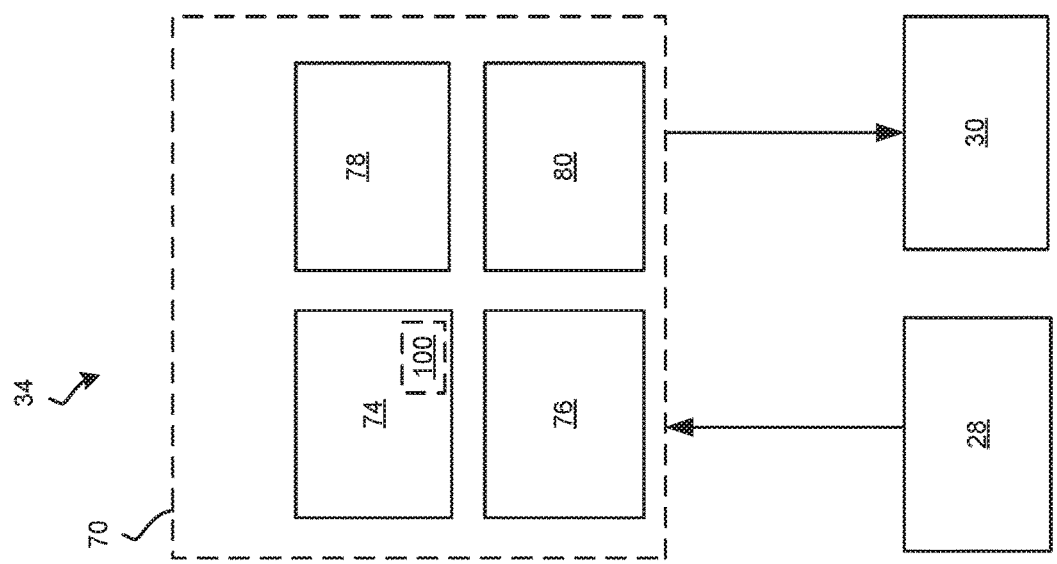
FIG. 2 is a schematic block diagram of an automated driving system (ADS) for a vehicle, in accordance with one or more exemplary embodiments.

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. In various embodiments, the data storage device 32 stores calibrations for use in aligning the sensing devices 40a-40n. In various embodiments, one or more of the calibrations are estimated as extrinsic parameter using the methods and systems described herein. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In various embodiments, one or more instructions of the controller 34 are embodied in the control system 100 and, when executed by the processor 44, cause the processor 44 to perform the methods and systems that dynamically align the sensor devices by updating calibrations stored in the data storage device 32 as described in greater detail below.

In accordance with various embodiments, the controller 34 implements an autonomous driving system (ADS) 70 as shown in FIG. 2. That is, suitable software and/or hardware components of the controller 34 (e.g., processor 44 and computer-readable storage device 46) are utilized to provide an autonomous driving system 70 that is used in conjunction with vehicle 10, for example, to automatically control various actuators 30 onboard the vehicle 10 to thereby control vehicle acceleration, steering, and braking, respectively, without human intervention.

In various embodiments, the instructions of the autonomous driving system 70 may be organized by function or system. For example, as shown in FIG. 2, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. In various embodiments, the computer vision system 74 receives information from and/or implements the control system 100 described herein.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 3:
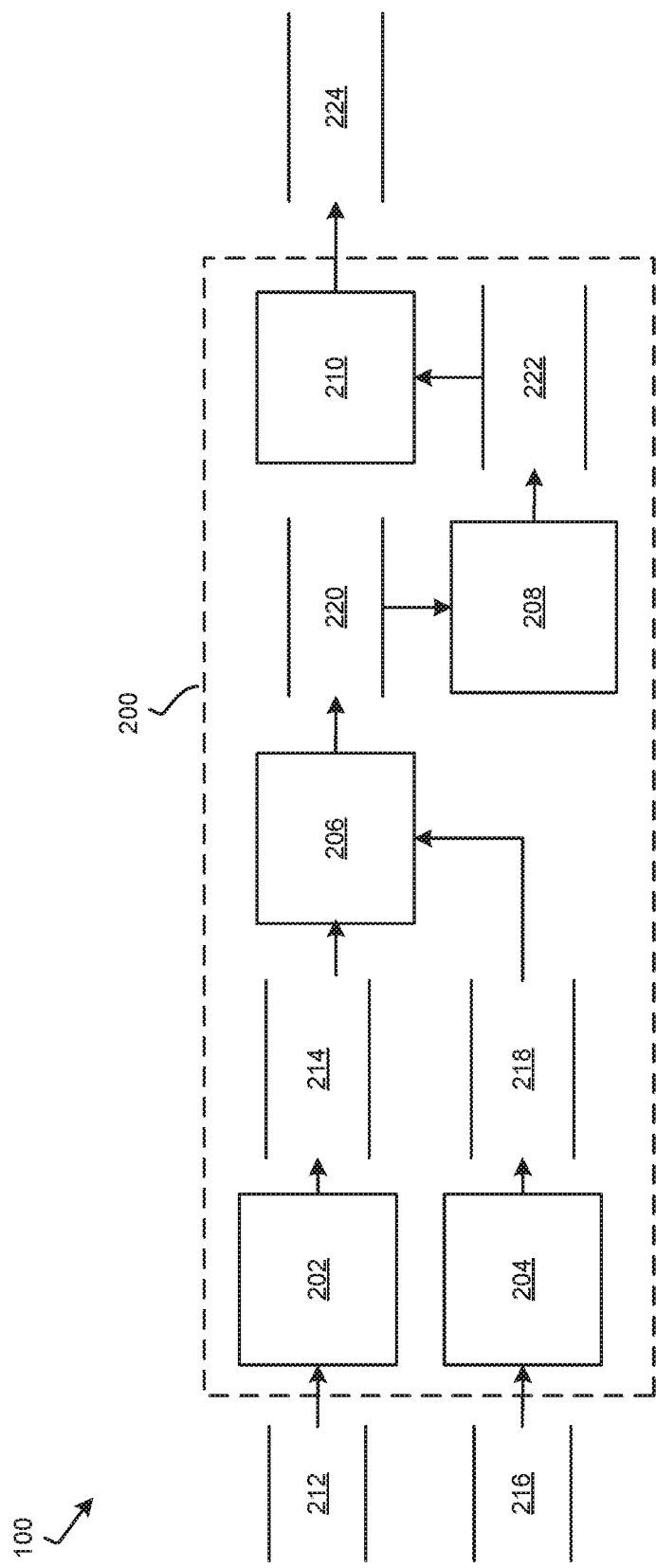
FIG. 3 is a dataflow diagram of a control module of the alignment system, in accordance with one or more exemplary embodiments.

With reference now to FIG. 3 and with continued reference to FIGS. 1 and 2, FIG. 3 depicts an embodiment of a control module 200 of the control system 100 which may be implemented by or incorporated into the controller 34, the processor 44, and/or the computer vision system 74. In various embodiments, the control module 200 may be implemented as one or more sub-modules. As can be appreciated, the sub-modules shown and described may be combined and/or further partitioned in various embodiments. Data inputs to the control module 200 may be received directly from the sensing devices 40a-40n, received from other modules (not shown) of the controller 34, and/or received from other controllers (not shown). In various embodiments, the control module 200 includes a camera edge detection module 202, a lidar edge detection module 204, data pair evaluation module 206, alignment manager module 208, and a calibration module 210.

The camera edge detection module 202 receives sensor data 212 including camera images generated by the camera sensor. The camera edge detection module 202 processes the sensor data 212 to identify object edges, such as vehicles, in the frame of the camera image and generate camera edge map data 214. For example, the camera edge detection module 202 performs a vehicle enhanced inverse distance transformation (IDT) edge map method to determine points of vehicle contours along the edges of the image. In various embodiments, the vehicle enhanced IDT edge map method provides a vehicle enhanced IDT map $D^t_{IDT}$ at time t given the initial guess of $\theta_0$ and the frame $X^t$.

Result: vehicle enhanced IDT map $D_{IDT}{}^t$ at time t.
Initial guess $\Theta_0$;
Obtain frame $X^t$;
  The complement of Canny edge detection:

$\bar{X}_{Canny}{}^t = 1 - f_{Edge}(X^\tau)$;

Distance transformation for Canny map:

$D_{x,y\ Canny}{}^t = \min_{u,v} \bar{X}_{u,v\ Canny}{}^t + (u-v)^2 + (v-x)^2$;

Inverse canny distance map:

$D_{Canny}{}^t = \max_{x,y} D_{x,y\ Canny}{}^\gamma - D^\gamma$;

Vehicle segmentation:

$X^t_{Vehicle} = f_{CNN}(X^t)$;

Filter all small vehicles from $X^t_{Vehicle}$;
Detect inverse vehicle contours:

$\bar{X}^t_{Contour} = 1 - f_{Edge}(X^t_{Vehicle})$;

Distance transformation for Canny map:

$D_{x,y\ Contour}{}^t = \min_{u,v} \bar{X}_{u,v\ Contour}{}^t + (u-v)^2 + (v-x)^2$;

Inverse contour distance map:

$D_{Contour}{}^t = \max_{x,y} D_{x,y\ Contour}{}^\gamma - D^\gamma$;

Final vehicle enhanced IDT map:

$D^t_{IDT} = D_{Contour}{}^t \cdot D_{Canny}{}^t$.

The lidar edge detection module 204 receives sensor data 216 including a lidar point cloud generated by the lidar sensor. The lidar edge detection module 204 processes the sensor data 216 to identify points of objects along the edges of the point cloud and generate lidar edge map data 218. For example, the lidar edge detection module 204 projects the three-dimensional point cloud to two-dimensional space using the initial calibrations. Thereafter, the lidar edge detection module 204 then estimates the edge points from the projected two-dimensional point cloud using, for example, the conventional edge map methods. In various embodiments, the lidar edge detection module 204 detects the edge points based on geometry values.

The data pair evaluation module 206 receives the camera edge map data 214, and the lidar edge map data 218. The data pair evaluation module 206 associates the edge points from the lidar edge map data 218 with the edge points from the camera edge map data 214 to create a data point pair. The data pair evaluation module 206 then evaluates the quality of data point pair. When the data pair is deemed of good quality, the data pair evaluation module 206 provides data pair data 220 for use in further processing. When the data pair is deemed of not good quality, the data pair evaluation module 206 discards the data pair for further processing.

In various embodiments, the data pair evaluation module 206 determines whether the data pair is good or not good quality based on a data quality estimation classifier, an ego-motion of the vehicle, and/or a vehicle count using a segmentation convolutional neural network. For example, in various embodiments, the data quality estimation classifier includes a trained support vector machine (SVM) method that classifies the quality of the data point pairs and rejects image frames with low quality. In another example, the ego-motion of the vehicle is determined from the image data and any image frames with vehicles deemed to be turning are rejected. In another example, the vehicle count in the image is determined using, for example, the vehicle segmentation from the image edge detection module and image frames with a low number of vehicles is discarded.

In various embodiments, the data pair evaluation module 206 can remove further bad pairs of data based on bad camera frames suffering from flare, glare, ghosting and blooming, motion blur, and poor lighted area, etc. In various embodiments, the data pair evaluation module 206 can remove further bad pairs of data based on bad lidar points, such as highly reflected traffic signs/boards.

The alignment manager module 208 receives the data pair data 220. The alignment manager module 208 aligns the data point pair using, for example, a six degrees of freedom (DOF) search method. For example, the six DOF search method estimates all six DOF (e.g., pitch, yaw, roll, x, y z,) of the points using an objective function. Given a data point pair from the image frame and the lidar point cloud, the alignment manager module 208 finds the maximum score of the objective function by scanning through all possible six DOF combinations (e.g., $3^6$ or 729 cases) with every DOF, being assigned -1, 0, or 1.

For j=[t, t−1, t−2, . . . 1] do
  Compute Lidar Edge: $\hat{P}^j_p = \max(\hat{P}^{j,depth}_{p-1} - \hat{P}^{j,dept}_p, \hat{P}^{j,depth}_{p+1} - \hat{P}^{j,depth}_p, 0)$;
  Filter out all irrelevant points from $\hat{P}^j_p$;
  // iterate through all $(3)^6$ different combinations on m;
  For t=[1, 2, . . . $(3)^6$] do $\hat{\Theta}^i = \Theta_0 + m_i \cdot \beta$;

Project all Lidar points in $\hat{P}^j$ onto the sparse image $X^i_P$ using $\hat{\Theta}^i$;
    Compute score $S^{i,j}(\hat{\Theta}^i) = \frac{\delta}{k} \Sigma\ D^j_{IDT} * X^i_{P_j}$;

End
  Find max score in $S^j(\hat{\Theta})$;
  Store parameters producing highest score in $\hat{\Theta}^j$;
End
Update Initial guess $\Theta_0 = AVG(\hat{\Theta})$;
Reduce Search space $\beta = \beta \cdot \alpha$ In various embodiments, the six DOF search method is implemented in two separate stages, a first or coarse stage includes a large search space (e.g., from 4 and gradually decreases to 0.04) to allow for large error handling, and a second or fine stage that includes a small search space (e.g., fixed at 0.04) to fine-tune the values. In various embodiments, the first stage utilizes data points of the vehicle enhanced IDT and the second stage utilizes data points from the canny IDT.

The calibration module 210 receives the parameter values 222. The calibration module 210 updates the calibrations associated with the lidar sensors and the camera sensors by storing the estimated extrinsic parameter values as the calibrations, for example, in the data storage device 36 for use by other systems of the ADS 70. In various embodiments, the calibration module 210 saves the extrinsic parameters when the estimated extrinsic parameters are better than ninety-six percent of all perturbations for more than X number of frames (e.g., 100 or some other value).

Figure 4:
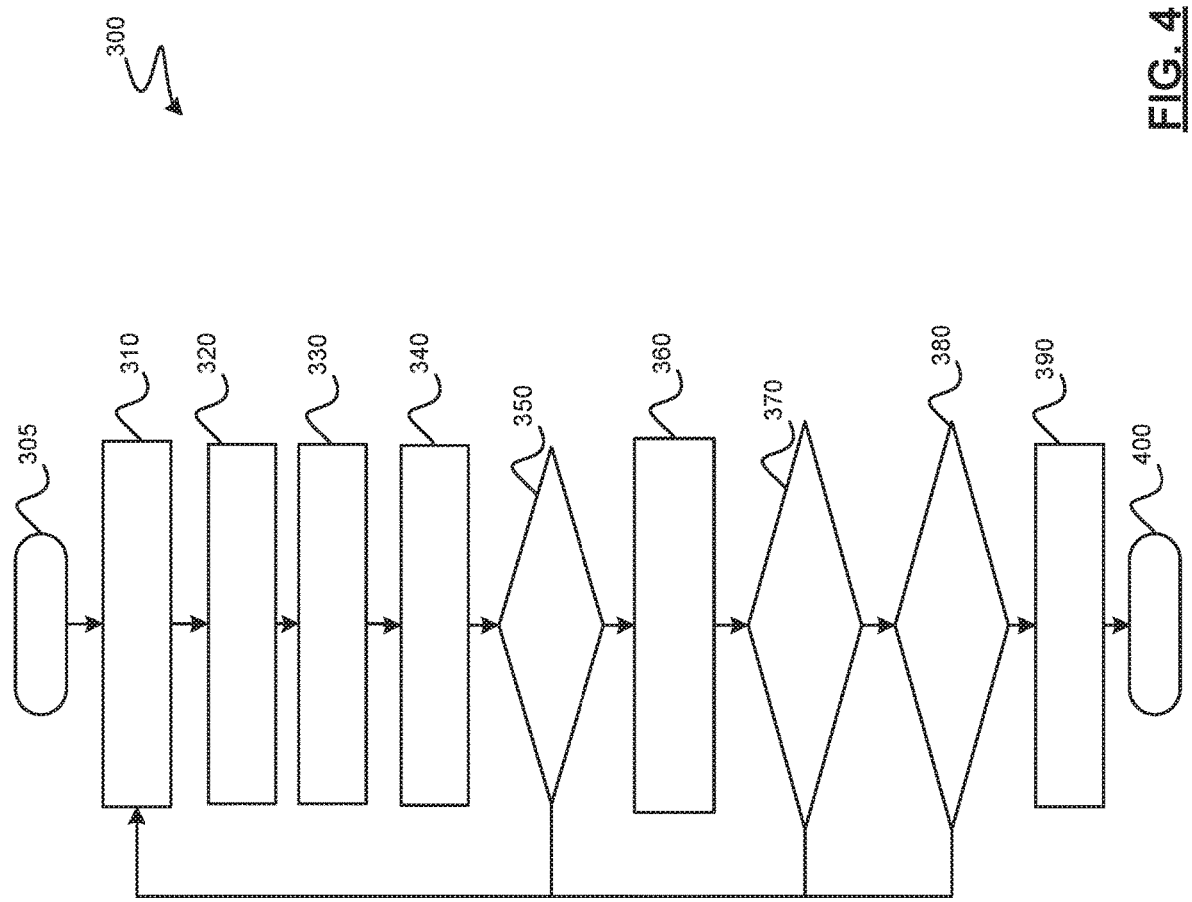
FIG. 4 is a flowchart illustrating an alignment method, in accordance with one or more exemplary embodiments.

Referring now to FIG. 4, and with continued reference to FIGS. 1-3, a flowchart illustrates various embodiments of a method 300 which may be embedded within a controller 34 in the control system 100 of FIG. 1 supporting the ADS 70 and the control module 200 of FIG. 3 in accordance with the present disclosure. As can be appreciated in light of the disclosure, the order of operation within the method 300 is not limited to the sequential execution as illustrated in FIG. 4 but may be performed in one or more varying orders as applicable and in accordance with the present disclosure. In various embodiments, the method 300 can be scheduled to run based on one or more predetermined events, and/or can run continuously during operation of the vehicle 10.

In various embodiments, FIG. 4 illustrates the method 300 for dynamic sensor alignment. In one example, the method 300 may begin at 305. The sensor data 212, 216 is received at 310. The vehicle enhanced IDT is computed from the image data at 320. The lidar edges are computed from the lidar point cloud data at 330. The image edge data points and the lidar edge data points are associated to create the data point pair which is evaluated for quality at 340 If the data pair is determined to be not good at 350, the data point pair is discarded and new data is received at 310. If, however, the data point pair is determined to be good at 350, method continues at 360.

At 360, the two stage six DOF method is performed to align the data point pairs to produce the extrinsic parameters. If the extrinsic parameters are better than ninety-six percent of all perturbations at 370, for more than, for example, 100 frames (or some other number) at 380, the extrinsic parameters are saved as the calibrations in the data storage device 36 at 390. Thereafter, the method may end at 400. If, however, the extrinsic parameters are not better than ninety-six percent of all perturbations at 370 or have not been for more than 100 frames at 380, the method continues with receiving the sensor data 212, 216 at 310.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle having a lidar device and a camera device, the method comprising:
   receiving, by a controller onboard the vehicle, lidar data from the lidar device;
   receiving, by the controller, image data from the camera device;
   computing, by the controller, an edge map based on the lidar data;
   computing, by the controller, an inverse distance transformation (IDT) canny map based on the image data;
   computing, by the controller, an IDT contour map based on the image data;
   computing, by the controller, an IDT edge map based on the IDT canny map and the IDT contour map;
   aligning, by the controller, points of the IDT edge map with points of the lidar edge map to determine extrinsic parameters;
   storing, by the controller, extrinsic parameters as calibrations in a data storage device; and
   controlling, by the controller, the vehicle based on the stored calibrations.

2. The method of claim 1, further comprising determining a quality of a pair of points in the IDT edge map and the lidar edge map, and wherein the aligning is based on the quality of the pair.

3. The method of claim 2, further comprising determining the quality of the pair based on a data quality estimation classifier.

4. The method of claim 2, further comprising determining the quality of the pair based on a computed ego-motion of a vehicle.

5. The method of claim 2, further comprising determining the quality of the pair based on a segmentation convolutional neural network.

6. The method of claim 1, wherein the aligning is based on a search method that computes six degrees of freedom of objects in the IDT edge map and the lidar edge map.

7. The method of claim 6, wherein the search method comprises a two-stage search method, the first stage comprising a coarse level of refinement, and the second stage comprising a fine level of refinement.

8. The method of claim 6, wherein the aligning is iteratively performed until a confidence estimation reaches a predefined percentage.

9. The method of claim 6, wherein the aligning is iteratively performed until a count of iterations reaches a predefined value.

10. The method of claim 1, further comprising filtering from the image data vehicles less than a predefined size, and wherein the computing the IDT contours map is based on the filtered image data.

11. A vehicle system of a vehicle, comprising:
    a lidar device;
    a camera device; and
    a controller configured to, by a processor, receive lidar data from the lidar device, compute a lidar edge map based on the lidar data, receive image data from the camera device, compute, an inverse distance transformation (IDT) canny map based on the image data, compute an IDT contour map based on the image data; computing, by the controller, an IDT edge map based on the IDT canny map and the IDT contour map, align points of the IDT edge map with points of the lidar edge map to determine extrinsic parameters, store extrinsic parameters as calibrations in a data storage device, and control the vehicle based on the stored calibrations.

12. The system of claim 11, wherein the controller is further configured to determine a quality of a pair of points in the IDT edge map and the lidar edge map, and wherein the aligning is based on the quality of the pair.

13. The system of claim 12, wherein the controller is further configured to determine the quality of the pair based on a data quality estimation classifier.

14. The system of claim 12, wherein the controller is further configured to determine the quality of the pair based on a computed ego-motion of a vehicle.

15. The system of claim 12, wherein the controller is further configured to determine the quality of the pair based on a segmentation convolutional neural network.

16. The system of claim 11, wherein the controller is configured to align based on a search method that computes six degrees of freedom of objects in the IDT edge map.

17. The system of claim 16, wherein the search method comprises a two-stage search method, the first stage comprising a coarse level of refinement, and the second stage comprising a fine level of refinement.

18. The system of claim 16, wherein controller is configured to iteratively align until a confidence estimation reaches a predefined percentage.

19. The system of claim 16, wherein the controller is configured to iteratively align until a count of iterations reaches a predefined value.

20. The system of claim 11, wherein the controller is further configured to filter from the image data vehicles less than a predefined size, and wherein the computing the IDT contours map is based on the filtered image data.

* * * * *